E. J. SMITH.
MACHINE FOR ATTACHING HOOKS AND EYES.
APPLICATION FILED DEC. 11, 1909.
1,152,855.
Patented Sept. 7, 1915.
3 SHEETS—SHEET 1.
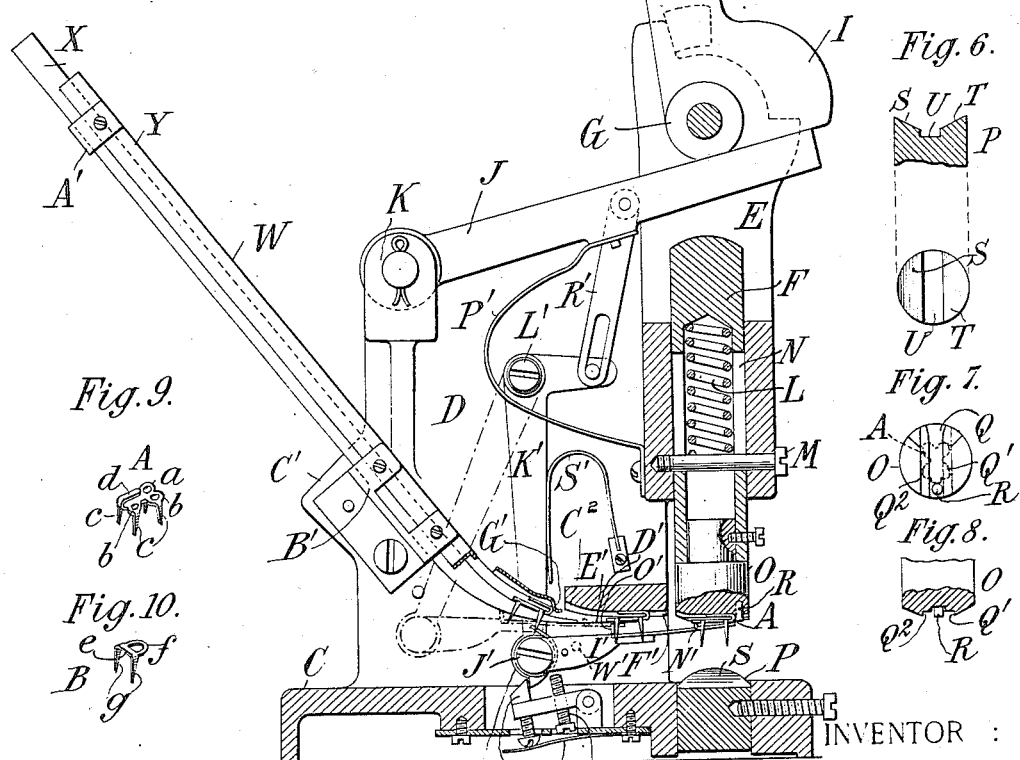
WITNESSES:
Fred White
Rene Bruine
INVENTOR:
Elizabeth J. Smith,
By Attorneys,
Arthur C. Fraser & Usina E. J. SMITH.
MACHINE FOR ATTACHING HOOKS AND EYES.
APPLICATION FILED DEC. 11, 1909.
1,152,855.
Patented Sept. 7, 1915.
3 SHEETS—SHEET 2.
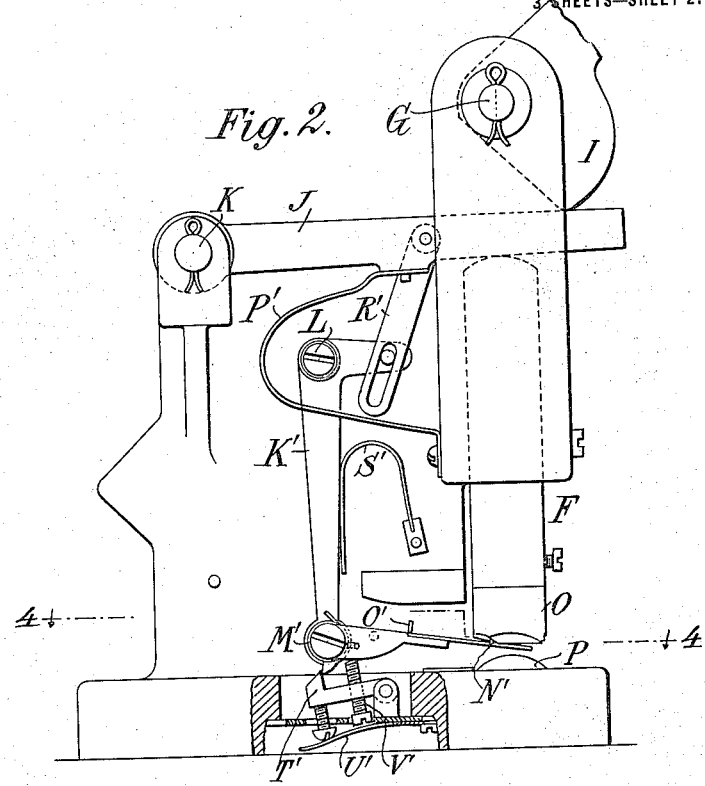
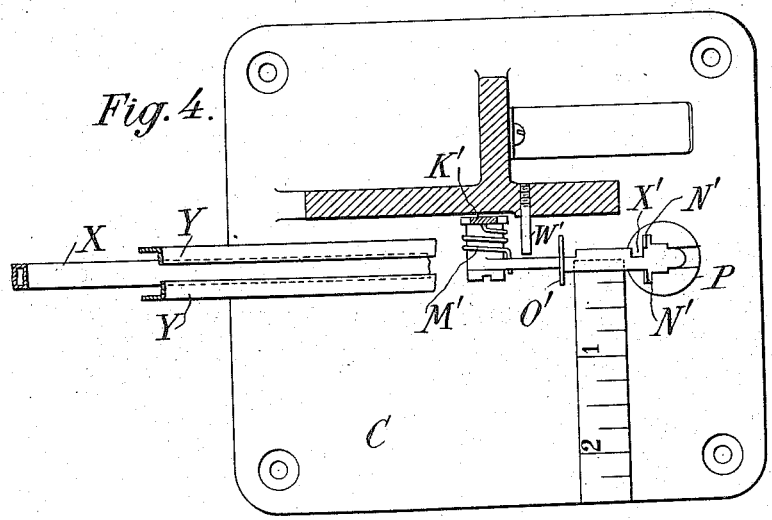
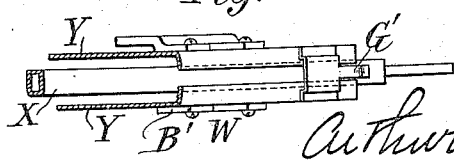
WITNESSES:
Fred White
Rene Bruine
INVENTOR:
Elizabeth J. Smith,
By Attorneys,
Arthur C. Fraser Morris INVENTOR:
Elizabeth J. Smith,
By Attorneys,

WITNESSES:

UNITED STATES PATENT OFFICE.

ELIZABETH J. SMITH, OF LARCHMONT, NEW YORK.

MACHINE FOR ATTACHING HOOKS AND EYES.

1,152,855.  Specification of Letters Patent.  Patented Sept. 7, 1915.

Application filed December 11, 1909. Serial No. 532,660.

*To all whom it may concern:*

Be it known that I, ELIZABETH J. SMITH, a citizen of the United States, residing in Larchmont, in the county of Westchester and State of New York, have invented certain new and useful Improvements in Machines for Attaching Hooks and Eyes, of which the following is a specification.

This invention relates to a device which is particularly adapted for attaching hooks and eyes to fabrics. The type of hook and eye which the machine is designed to attach is that in which a hook and preferably also the eye are each formed of a single piece of sheet metal having fastening prongs adapted to be forced through the fabric and bent upwardly on the under side of the fabric. In this type of hook and eye which is illustrated in my Patent No. 796,158, dated August 1, 1905, a base portion or portions are provided against which the fabric is clamped by oppositely arranged prongs which are bent tightly against the fabric, so that they lie alongside of each other on the under side of the fabric.

The machine of the present invention is provided with a magazine adapted to hold a considerable number of hooks or eyes, a feed mechanism which is adapted to successively advance a hook or eye to a point above or opposite the fabric, and a pair of dies which are adapted to press the hook or eye through the fabric and bend its prongs to securely clamp it to the fabric.

The invention includes numerous other features of novelty which will be hereinafter more fully pointed out.

Figure 11:
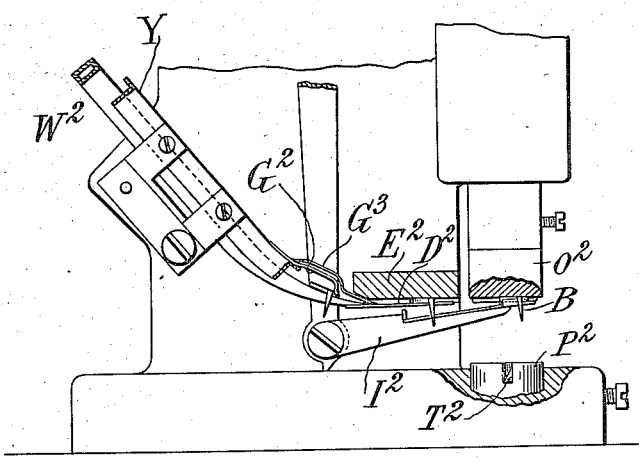
Figures 12, 13:
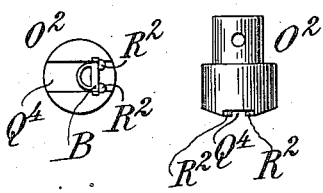
Figures 14, 15:
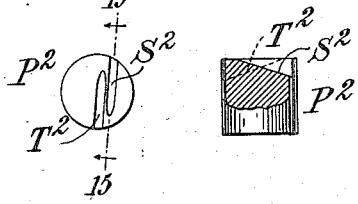
Figure 16:
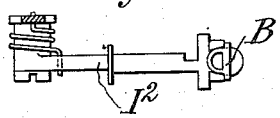

Referring to the drawings which illustrate the preferred form of the invention,—Figure 1 is an elevation partly in vertical section of the complete machine, showing the parts in the positions which they occupy just prior to the descent of the upper die. Fig. 2 is a similar view of the working parts, illustrating the positions of the parts when the hook is about to be pressed through the fabric. Fig. 3 is a similar view showing the positions of the parts when the feed tongue has left the hook and is moving backward to reëngage the next hook. Fig. 4 is a section on the line 4—4 in Fig. 2. Fig. 5 is a detail partly in section of the magazine and feed guide. Fig. 6 shows a plan and diametrical section of the lower die. Fig. 7 is a bottom view of the upper die. Fig. 8 is a diametrical section of Fig. 7. Figs. 9 and 10 are perspective views of a form of hook and eye which the machine of the present invention is especially adapted to apply. Fig. 11 is a view similar to Fig. 1 of the machine as constructed for use in connection with the eye. Fig. 12 is an under side view of the upper die of Fig. 11. Fig. 13 is a front elevation of Fig. 12. Fig. 14 is a plan of the under die of Fig. 11. Fig. 15 is a section on the line 15—15 of Fig. 14. Fig. 16 is a plan partly in section of the feeder arm of Fig. 11.

The machine illustrated in Figs. 1 to 8 is especially designed to attach a hook of the construction shown at A in Fig. 9, which hook is provided with a body portion $a$ having on each side two extensions $b$ and fastening prongs $c$. A suitable bill $d$ is provided of any desired shape. The body with its extensions forms base portions against which the fabric is clamped by the prongs. With this hook is usually combined an eye B shown in Fig. 10 which comprises a body portion $e$ having an integral loop portion $f$ and fastening prongs $g$. The machine illustrated in Figs. 1 to 8 is capable with a slight modification of also attaching eyes of the type of Fig. 10.

Figure 17:
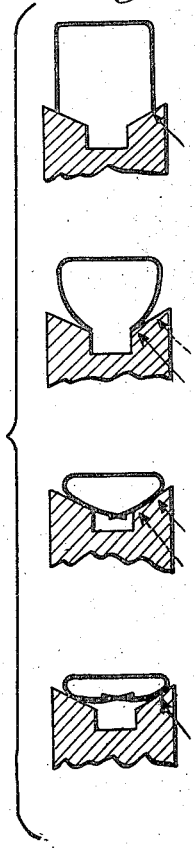

Referring now to Figs. 1 to 8, C indicates a suitable base plate which is provided with an upright web or standard D, the front part of which carries a guide E for the plunger F, and above said guide a journal G for the hand lever H. The lower end of the lever H is formed with a cam I which is adapted to depress the plunger F. The cam I does not act directly against the plunger, but against the lever J pivoted at K to the rear of the machine, the lever J serving to transmit the movements of the hand lever to the plunger, and also to actuate through suitable connections the mechanism for feeding the hooks from the magazine to a point beneath the plunger. The plunger is normally held in an elevated position by a spring L located in the interior thereof, the lower end of which engages a screw or other abutment M, and the upper end of which presses against the upper part of the plunger. The screw M passes through slots N N formed in the plunger, and thereby prevents turning of the latter. In the lower part of the plunger is arranged the upper die O, while the lower die P is suitably secured in the base plate C. The upper die O, an under side view of which is illustrated in Fig. 7, is adapted to receive the bill of the hook A, so that the extensions $b$ of the latter rest against the working parts of the die, as illustrated in Fig. 1. The die is formed with a groove Q opening toward the rear of the machine along which groove the bills of the hooks are pushed by the feeding mechanism to be described until they reach the stop R which prevents their further forward movement. The groove Q is flared or widened on its receiving end in order that the bills of the hooks will certainly enter therein despite slight variations in the positions of the hooks as they are thrust forward by the feeding mechanism. The die O is also provided with working edges $Q'$ $Q^2$ forming a shallow groove between them into which groove the body of the hook (as distinguished from the bill) is forced at the end of the bending operation. The lower die which accomplishes the actual bending of the prongs is an important feature of the invention. It is illustrated in Fig. 6. As shown it comprises two inclined guiding surfaces S and T having located between them a groove or recess U. During the descent of the hook when forced down by the plunger, the ends of the prongs first strike the inclines S and T. This bends the prongs inwardly slightly and as the plunger descends they are bent to such an extent that their ends pass into the groove U. A continued downward movement causes the faces or inclines of the die to bend the prongs sharply near their juncture with the extensions $b$ forcing the ends of the prongs upwardly out of the groove toward the under side of the hook. At the end of the operation the prongs lie flat closely against such under side with the fabric tightly held against the latter. Preferably the prongs of the hook are offset or staggered so that when bent the prongs of each pair lie alongside of each other. The action of the dies upon fasteners may be more fully explained in connection with Fig. 17, illustrating a fastener against a bending die, in various stages which it undergoes in the bending operation. The points of the prongs first come into contact with the highest part of the die (as shown in the first position) and slide down the inclines or faces of the die as the fastener is pressed down on the die. (See the second position.) The slot through the middle of the die allows the points of the prongs to move free. (See third position.) As the points of the prongs reach the lower parts of the inclines or faces of the die, the active part of the die is transferred from the lower parts of the inclines or faces to the upper parts of the inclines or faces. The upper parts of the inclines then engage the base-portions of the prongs and bend them sharply, the points of the prongs leaving the faces of the die and being pressed in extended position against the underside of the fabric to which the fastener is to be attached (as in the fourth position).

Preferably a suitable magazine such as W is provided which as best seen in Figs. 4 and 5 comprises a guide X which the hooks are adapted to straddle, and on each side of which is arranged a guide plate Y adapted to prevent the hooks from piling up one upon another. The guides Y are held a sufficient distance apart to receive the bills of the hooks by plates $A'$ $B'$, the latter being mounted upon a bracket $C'$ fixed to the web or upright D. At the bottom of the magazine the guide X is turned to near the horizontal and is tapered as shown at $C^2$ at which point it has fixed to it a horizontal spring arm $D'$, which arm extends along the under side of a guide block $E'$ formed on its under side with a guide groove $F'$ designed to receive the bill of the hook when the latter leaves the guide X, and rides on the spring arm $D'$. Near the end of the guide X is provided a spring catch $G'$, which engages the front part of the bill of the lowermost hook to hold back the succession of hooks in the magazine above it until the lowermost hook is moved outwardly by the feeding mechanism, and the next succeeding one takes its place. The feeding mechanism is adapted during each forward movement to move the lowermost hook in the magazine forwardly until it occupies a position in the guide block $E'$ shown in Fig. 1, and to also feed the hook which previously occupied such position forwardly under the upper die O. A further function of the feeding mechanism is to hold the hook which is fed to the die in a proper position under the latter until the die has descended far enough to bring the ends of the prongs in contact with the cloth or lower die, whereupon the feeding member is retracted. In the construction shown the feeder (which is lettered $I'$) comprises an arm which is pivoted at $J'$ to the lower arm of the bell crank lever $K'$, which lever is pivoted to the web D at $L'$. Encircling the pivotal connection between the feeder arm $I'$ and lever $K'$ is a helical spring $M'$, one end of which is fastened to the bell crank lever $K'$, and the other end of which is connected to the feeder arm. The effect of this spring is to hold the feeder arm at all times in its uppermost position except when it is depressed by the plunger. By reference to Figs. 2, 3 and 4, it will be seen that the feeder arm has near its forward end two projections or lugs $N'$ which are designed to engage the rear end of the forward hook which is held in the guide block $E'$, the projecting end of the feeder arm passing between the prongs of the hook and supporting the body thereof. About the middle of the feeder arm is a lug O' which extends upwardly from the arm, and which is designed to engage the bottom hook in the magazine. The two hooks, one at the bottom of the magazine and the other which has been fed forward by a previous stroke of the feeder arm onto the guide block E', are engaged while the feeder arm is in its rearward position as indicated in dotted lines in Fig. 1. When the arm moves forwardly, the hook upon the guide-block E' engaged by the lugs N' is carried bodily out of the guide block E', and held under the die O, while the hook at the bottom of the magazine engaged by the lug O' is moved from under the spring catch G' into position in the guide block E'. The mechanism which provides these movements will now be described.

The arm J which is interposed between the cam of the lever handle H and the upper end of the plunger F is held normally in its uppermost position by a spring P', and to this arm J is pivoted a slotted link R', the lower end of which engages the short arm of the bell crank lever K'. The bell crank lever is provided with a spring S' which tends to hold the bell crank and with it the feeder arm in their rearward positions. The forward or actuating movement of the feeder arm is produced by the link R' which as the arm J moves upwardly after each downward movement of the plunger moves into effective engagement with the short arm of the lever K', thus rocking the latter so that its lower end moves forwardly, carrying with it the feeder arm I'. When the parts are in the position of Fig. 1 wherein a hook is held under the die O, if the handle H be depressed the first effect is to move the lever J downwardly so that the lever arm is no longer held in its forward position by the link R'. To prevent the bell crank lever and the feeder arm from moving backwardly and releasing the hook which is held under the die, I provide a catch T' which is pressed upwardly by a spring U' and engages the tooth on the lower end of the long arm of the bell crank lever K'. As the handle H is moved farther downward, the arm J engages the plunger F and depresses the latter, not only carrying with it the hook beneath it, but also tilting the feeder arm I' around its pivot J'; this movement continues until the ends of the prongs of the hook either engage with the cloth or strike the lower die, so that the hook is no longer liable to become misplaced, whereupon it becomes necessary to retract the feeder arm I' so that its end may not be caught between the body and prongs of the hook as the latter are bent. To effect this retraction of the feeder arm I', it is first necessary to release the catch T', and this is accomplished in the present construction by an adjustable screw V' upon the catch T' which is engaged by the lower face of the feeder arm when the latter has been depressed to the proper point. This engagement results in the release of the hook T', whereupon the bell crank lever K' under the impulse of its spring S' moves rearwardly carrying with it the feeder arm I'. Further depression of the lever H forces the prongs of the hook through the fabric and upsets or bends them against the under side of the latter in the manner hereinbefore described.

In order to prevent the feeder arm I' from moving upwardly under the stress of its spring M' immediately when the arm is released from the die O, I provide a means for temporarily holding the arm in its depressed position until it is moved so far back that it will engage the two hooks in feeding position, i. e. the hooks at the bottom of the magazine and on the guide block E', at their rears. This means in the construction shown comprises a pin W' fastened to the web D, which pin engages the upper side of the feeder arm during its rearward movement until the feeder arm has reached the point where an upward movement will carry it to the proper position ready to engage the two forward hooks. At this point a slot X' formed in the feeder arm reaches the pin W', and permits the arm to swing to its uppermost position.

The operation of the device thus described will be apparent from the foregoing description. Briefly it is as follows:—A supply of hooks being inserted in the magazine the lowermost hook will by gravity reach a position in which it is held by the spring catch G'. Upon the depression of the hand lever H the feeder arm will move backwardly into position to engage such hook. Upon elevation of the hand lever the feeder arm will move forwardly carrying with it the lowermost hook into the guide block E'. Assuming that there has been no previous operation, no hook will be fed to the die. Upon a second depression of the hand lever the feeder arm will again move back, its lug O' passing behind the lowermost hook in the magazine and its lugs N' passing behind the hook already fed to the guide block. Upon a succeeding elevation of the hand lever, the hook in the guide block is moved under the die and the lowermost hook in the magazine is moved into the guide block. When the hand lever is again depressed the actual operation commences, the hook beneath the die being pressed downwardly through the fabric and its prongs folded. After the first two movements of the hand lever which are necessary to start the machine, the hooks are fed into position upon each upward movement of the hand lever.

In Figs. 11 to 16 I have shown the machine altered slightly to apply the eye shown in Fig. 10. The main parts of the machine remain unchanged, but several of the working parts are adapted to be substituted for those shown in Fig. 1 so that the same machine can thereby be adapted to apply the eyes. The magazine $W^2$ is similar to the magazine W except that one of the guide plates Y is omitted. At the end of the magazine two spring arms $G^2$ and $G^3$ are used, the first being designed to hold back the eyes in the position of Fig. 11, and the second ($G^3$) being designed to place a tension upon the eyes as they are fed forwardly under the guide block $E^2$. The guide block $E^2$ is substantially flat on its under surface since the eye has no counterpart of the bill of the hook which the groove F' is intended to receive. The feeder arm $I^2$ is substantially the same as the feeder arm I' of Fig. 1 except that it is slightly modified to better engage the eye as illustrated in Fig. 16. The upper die $O^2$ (Fig. 12) is provided with a groove $Q^4$ designed to receive the base and loop portion of the eye as illustrated in Fig. 12, while stops $R^2$ $R^2$ are provided to limit the forward movement of the eye. The lower die $P^2$ is provided with inclined die faces $S^2$ $T^2$ which are adapted to bend the prongs of the eye upwardly and clamp them against the under side of the fabric.

The operation of applying the eyes will be understood from the description of the operation of applying the hooks, which operation has already been described.

While I have described one embodiment of the invention, it will be understood that I do not wish to be limited thereto since the construction set forth may be greatly varied without departing from the invention. The principal object of the invention is to provide a machine for attaching hooks and eyes of substantially the kind described to a fabric so that the necessity of applying them by hand is avoided.

What I claim is:—

1. In a machine of the kind described, the combination of two dies, one adapted to press down upon the upper side of a pronged member of a hook and eye fastener, and the other having fixed inclined faces permitting free movement of the ends of the prongs in the direction of the incline, adapted to first engage the prongs at the points thereof to bend the prongs inward, then engage the body of the prongs to bend them inward and upward and then engage the prongs at the bases thereof to bend the prongs bodily upward against the underside of goods to which the fasteners are applied, whereby the prongs are substantially bodily bent from a position at right angles to the body of the member to a position substantially parallel therewith.

2. In a machine of the kind described, the combination of two dies, one adapted to press down upon the upper side of a pronged member of a hook and eye fastener, and the other having fixed straight inclined faces permitting free movement of the ends of the prongs in the direction of the incline, adapted to first engage the prongs at the points thereof to bend the prongs inward, then engage the body of the prongs to bend them inward and upward, and then engage the prongs at the bases thereof to bend the prongs bodily upward against the underside of goods to which the fasteners are applied, whereby the prongs are substantially bodily bent from a position at right angles to the body of the member to a position substantially parallel therewith.

3. In a machine of the kind described, the combination of two dies, one adapted to press down upon the upper side of a pronged member of a hook and eye fastener, and the other having fixed inclined faces permitting free movement of the ends of the prongs in the direction of the incline, adapted to first engage the prongs at the points thereof to bend the prongs inward, then engage the body of the prongs to bend them inward and upward and then engage the prongs at the bases thereof to bend the prongs bodily upward against the underside of goods to which the fasteners are applied, whereby the prongs are substantially bodily bent from a position at right angles to the body of the member to a position substantially parallel therewith, and means for retaining a fastener in position between said dies.

4. In a machine of the kind described, the combination of two dies, one adapted to press down upon the upper side of a pronged member of a hook and eye fastener, and the other having fixed inclined faces permitting free movement of the ends of the prongs in the direction of the incline, adapted to first engage the prongs at the points thereof to bend the prongs inward, then engage the body of the prongs to bend them inward and upward and then engage the prongs at the bases thereof to bend the prongs bodily upward against the underside of goods to which the fasteners are applied, whereby the prongs are substantially bodily bent from a position at right angles to the body of the member to a position substantially parallel therewith, and automatic means for feeding a fastener to a position between said dies.

5. In a machine of the kind described, the combination of two dies, one adapted to press down upon the upper side of a pronged member of a hook and eye fastener and the other having fixed inclined faces having a recess at the lower edges thereof, said recess thus permitting free movement of the ends of the prongs in the direction of the incline, said faces being adapted to first engage the prongs at the points thereof to bend the prongs inward, then engage the body of the prongs to bend them inward and upward and then engage the prongs at the bases thereof to bend the prongs bodily upward against the underside of goods to which the fasteners are applied, whereby the prongs are substantially bodily bent from a position at right angles to the body of the member to a position substantially parallel therewith.

6. In a machine of the kind described, the combination of an upper die having a diametrical groove upon its underside for receiving the bill of a pronged hook, and having shoulders on either side of said groove for engaging the body of the pronged hook, said groove being of a depth to receive and retain the bill without the bill being pressed upon by the die with a bending force, and a lower die having fixed inclined faces permitting free movement of the ends of the prongs in the direction of the incline, adapted to first engage the prongs at the points thereof to bend the prongs inward, then engage the body of the prongs to bend them inward and upward and then engage the prongs at the bases thereof to bend the prongs bodily upward against the underside of goods to which the fasteners are applied, whereby the prongs are substantially bodily bent from a position at right angles to the body of the member to a position substantially parallel therewith.

7. In a machine of the character described, the combination of two dies, a magazine and a feed member adapted to transfer a member of a pronged hook and eye fastener from said magazine to a position between said dies and to press and retain the member against the face of one of said dies during the approach of said dies.

8. In a machine of the character described, the combination of two dies, a magazine, and a pivotally mounted feed member adapted to transfer a member of a pronged hook and eye fastener from said magazine to a position between said dies and to press and retain the member against the face of one of said dies during the approach of said dies.

9. In a machine of the character described, the combination of two dies, one of which is movable, a magazine, and a feed member adapted to transfer a member of a pronged hook and eye fastener from said magazine to a position between said dies and to press and hold the member against the face of said movable die during the approach of said dies.

10. In a machine of the kind described, the combination of two dies, a magazine, a lever, a feed arm pivoted thereto, means for moving said lever and feed arm forward to advance pronged members of a hook and eye fastener from said magazine to said dies, means for holding said feed arm in the forward position during part of the movement of the movable die, said feed arm being adapted to press and hold the fastener against the face of one of said dies while held in its forward position, and means for releasing said feed arm about the time the fasteners come into contact with the goods and before the completion of the action of said dies.

11. In a machine of the character described, the combination of two dies, a magazine, and a feed device adapted to transfer a member of a pronged hook and eye fastener from said magazine to a position between said dies and to press and hold the member against the face of one of said dies during the approach of said dies, said feed device comprising a pivoted lever, and a feed arm pivoted to one end thereof.

12. In a machine of the character described, the combination of two dies, a magazine, and a feed device adapted to transfer a member of a pronged hook and eye fastener from said magazine to a position between said dies and to press and hold the member against the face of one of said dies during the approach of said dies, said feed device comprising a pivoted lever, a feed arm pivoted to one end thereof and a spring connected to said arm and lever.

13. In a machine of the kind described, the combination of dies, a movable plunger carrying one of said dies, a magazine, and a feeding mechanism comprising a lever, a feeder arm pivoted to the lower end of said lever, a spring tending to move said arm upwardly, means for actuating said lever to move a member of a hook and eye fastener from the magazine to a position between said dies, a catch for holding said lever in its forward position, and a part engaged by said feeder arm for releasing said catch when said arm has been moved downwardly to a given extent by said plunger.

14. In a machine of the kind described, the combination of two dies, one adapted to press down upon the upper side of a pronged member of a hook and eye fastener, and the other having fixed inclined faces permitting free movement of the ends of the prongs in the direction of the incline, and adapted to first engage the prongs at the points thereof to bend the prongs inward, then engage the body of the prongs to bend them inward and upward and then engage the prongs at the bases thereof to bend the prongs bodily upward against the underside of goods to which the fasteners are applied, whereby the prongs are substantially bodily bent from a position at right angles to the body of the member to a position substantially parallel therewith, a magazine, and means for feeding said members individually from said magazine to a position between said dies and retaining said members against the face of one of the dies during the approach of said dies.

15. In a machine of the kind described, the combination of two dies, one adapted to press down upon the upper side of a pronged member of a hook and eye fastener, and the other having fixed inclined faces permitting free movement of the ends of the prongs in the direction of the incline, and adapted to first engage the prongs at the points thereof to bend the prongs inward, then engage the body of the prongs to bend them inward and upward and then engage the prongs at the bases thereof to bend the prongs bodily upward against the underside of goods to which the fasteners are applied, whereby the prongs are substantially bodily bent from a position at right angles to the body of the member to a position substantially parallel therewith, a magazine, and means for feeding said members individually from said magazine to a position between said dies, said means comprising a feeder arm adapted to advance a member from said magazine to a position between said dies and to retain said member against the face of one of the dies during the approach of said dies.

16. In a machine of the kind described, the combination of two dies, one adapted to press down upon the upper side of a pronged member of a hook and eye fastener, and the other having fixed inclined faces permitting free movement of the ends of the prongs in the direction of the incline, and adapted to first engage the prongs at the points thereof to bend the prongs inward, then engage the body of the prongs to bend them inward and upward and then engage the prongs at the bases thereof to bend the prongs bodily upward against the underside of goods to which the fasteners are applied, whereby the prongs are substantially bodily bent from a position at right angles to the body of the member to a position substantially parallel therewith, a magazine adapted to contain a plurality of members of a hook and eye fastening, and means for feeding said members individually from said magazine to a position between said dies, said means comprising a feeder arm having means thereon adapted to engage the lowermost and next to the lowermost member in the magazine and to advance one of said members into position between said dies, and the other into position to be moved between said dies at the next operation.

17. In a machine of the kind described, the combination of two dies, one adapted to press down upon the upper side of a pronged member of a hook and eye fastener and the other having fixed inclined faces permitting free movement of the ends of the prongs in the direction of the incline, and adapted to first engage the prongs at the points thereof to bend the prongs inward, then engage the body of the prongs to bend them inward and upward and then engage the prongs at the bases thereof to bend the prongs bodily upward against the underside of goods to which the fasteners are applied, whereby the prongs are substantially bodily bent from a position at right angles to the body of the member to a position substantially parallel therewith, a magazine adapted to contain a plurality of members of a hook and eye fastening, and means for feeding said members individually from said magazine to a position between said dies, said means comprising a feeder arm having means thereon adapted to engage the lowermost and next to the lowermost member in the magazine and advance one of said members into position between said dies and the other into position to be moved between said dies at the next operation, and said feeder arm being adapted to hold the member against the underside of the upper die during descent of the latter.

18. In a machine of the kind described, the combination of two dies, a magazine, a guide block, and a feeder arm adapted to move a member of a hook and eye fastener from said magazine to said guide block, and a member from said guide block to a position between the dies, said feed arm being adapted to retain said member in position between the dies against one of the dies during approach of the dies.

19. In a machine of the kind described, the combination of two dies, one adapted to press down upon the upper side of a pronged member of a hook and eye fastener and the other having fixed inclined faces permitting free movement of the ends of the prongs in the direction of the incline, and adapted to first engage the prongs at the points thereof to bend the prongs inward, then engage the body of the prongs to bend them inward and upward and then engage the prongs at the bases thereof to bend the prongs bodily upward against the underside of goods to which the fasteners are applied, whereby the prongs are substantially bodily bent from a position at right angles to the body of the member to a position substantially parallel therewith, and means for retaining said fasteners on the underside of the upper die, means for releasing said fastener-retaining means prior to said upper die completing its downward movement, said releasing means being operated by said upper die in its downward movement.

20. In a machine of the kind described, the combination of two dies, one adapted to press down upon the upper side of a pronged member of a hook and eye fastener, and the other having fixed inclined faces permitting free movement of the ends of the prongs in the direction of the incline, and adapted to first engage the prongs at the points thereof to bend the prongs inward, then engage the body of the prongs to bend them inward and upward and then engage the prongs at the bases thereof to bend the prongs bodily upward against the underside of goods to which the fasteners are applied, whereby the prongs are substantially bodily bent from a position at right angles to the body of the member to a position substantially parallel therewith, and means for feeding fasteners to a position between said dies, said means pressing said fasteners against the lower face of said upper die, and means for releasing said fastener-retaining means prior to said upper die completing its downward movement, said releasing means being operated by said upper die in its downward movement.

In witness whereof, I have hereunto signed my name in the presence of two subscribing witnesses.

ELIZABETH J. SMITH.

Witnesses:
 EUGENE V. MYERS,
 FRED WHITE.